United States Patent
Altheimer et al.

(10) Patent No.: US 7,338,162 B2
(45) Date of Patent: Mar. 4, 2008

(54) WORKPLACE SCREEN LENS

(75) Inventors: Helmut Altheimer, Baisweil-Lauchdorf (DE); Gregor Esser, Munich (DE); Walter Haimerl, Munich (DE); Edda Wehner, Emmering (DE); Andrea Welk, Munich (DE)

(73) Assignee: Rodenstock GmbH, Munich (DE)

( * ) Notice: Subject to any disclaimer, the term of this patent is extended or adjusted under 35 U.S.C. 154(b) by 0 days.

(21) Appl. No.: 10/576,929

(22) PCT Filed: Oct. 25, 2004

(86) PCT No.: PCT/EP2004/012032

§ 371 (c)(1),
(2), (4) Date: Mar. 2, 2007

(87) PCT Pub. No.: WO2005/040894

PCT Pub. Date: May 6, 2005

(65) Prior Publication Data
US 2007/0252949 A1    Nov. 1, 2007

(30) Foreign Application Priority Data
Oct. 23, 2003  (DE) ................................ 103 49 726

(51) Int. Cl.
*G02C 7/06* (2006.01)
(52) U.S. Cl. ........................................ 351/169; 351/177
(58) Field of Classification Search ................ 351/169, 351/177

See application file for complete search history.

(56) References Cited

U.S. PATENT DOCUMENTS 4,537,479 A * 8/1985 Shinohara et al. .......... 351/169

(Continued)

FOREIGN PATENT DOCUMENTS

DE         36 25 526 A1    3/1987

(Continued)

OTHER PUBLICATIONS

International Search Report dated Feb. 22, 2005 including English Translation of relevant portion and PCT/ISA/237 (Fourteen (14) pages).

(Continued)

*Primary Examiner*—Scott J. Sugarman
(74) *Attorney, Agent, or Firm*—Crowell & Moring LLP

(57) ABSTRACT

A workplace screen lens, having a workplace screen lens optimized at the middle of the lens for the middle viewing distances of approximately 60 centimeters to approximately 90 centimeters, and the progressive channel at the middle of the lens is at least 4 millimeters wide. The effect increases from the middle of the lens toward the bottom with the vertical coordinate y equal to approximately 0, reaching a near vision zone with an essentially constant effect at y equal to approximately −12 millimeters. The progressive channel has a width of least 15 millimeters in the near vision zone, preferably at the near-reference point, the effect decreases from the middle of the lens up to y equal to approximately +10 millimeters to approximately +12 millimeters above the middle of the lens. The progressive length amounts to approximately 20 millimeters to approximately 25 millimeters, the main progressive length is between approximately 7 millimeters and approximately 12 millimeters, and the minimum width of the progressive channel amounts to at least 4 millimeters.

20 Claims, 3 Drawing Sheets

U.S. PATENT DOCUMENTS

Figure 1:
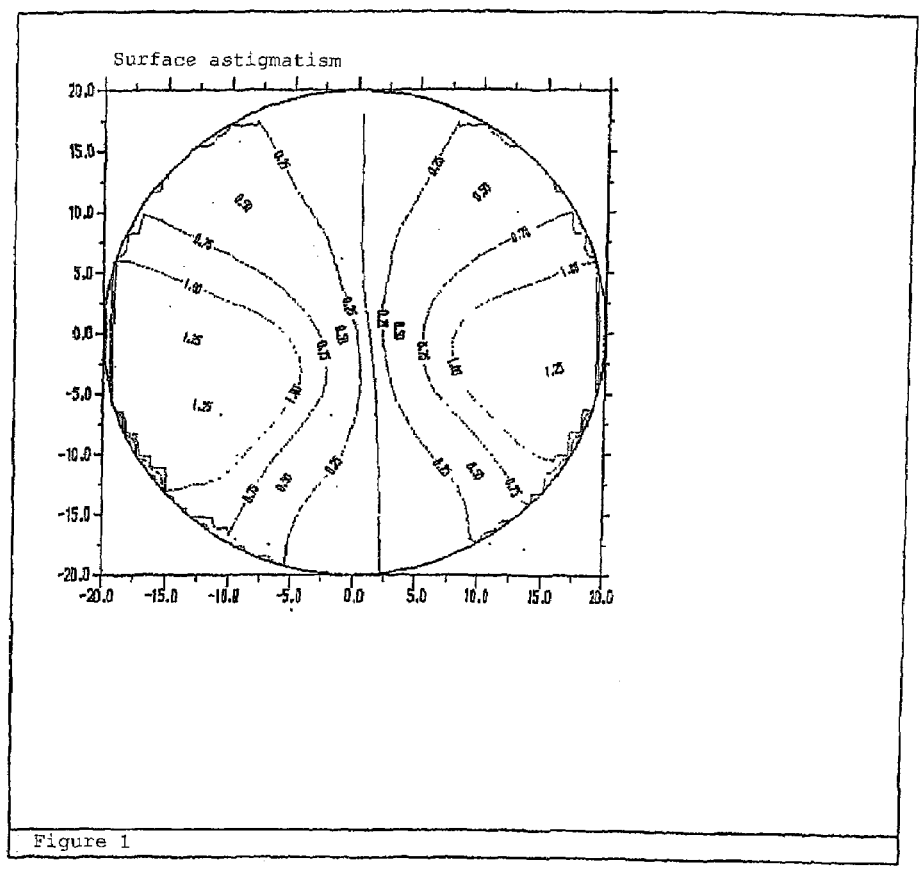

| | | |
|---|---|---|
| 4,796,988 A | 1/1989 | Dufour et al. |
| 4,854,689 A | 8/1989 | Dufour et al. |
| 5,506,630 A | 4/1996 | Ueno et al. |
| 5,864,380 A | 1/1999 | Umeda |
| 6,390,623 B1 | 5/2002 | Kokonaski et al. |
| 2001/0030735 A1 | 10/2001 | Yamamoto |
| 2003/0128331 A1 | 7/2003 | Yamamoto |
| 2004/0189932 A1 | 9/2004 | Shinohara et al. |

FOREIGN PATENT DOCUMENTS

| | | |
|---|---|---|
| DE | 36 35 616 C2 | 4/1987 |
| EP | 0 627 647 A2 | 12/1994 |
| EP | 0 911 670 A1 | 4/1999 |
| EP | 0 911 673 A1 | 4/1999 |
| EP | 1 429 172 A1 | 6/2004 |

OTHER PUBLICATIONS

German Office Action dated Jul. 16, 2004 (Two (2) pages).
Form PCT/IB/338, Form PCT/IB/373, and Form PCT/ISA/237 (Nine (9) Pages) PCT/EP2004/012032.

\* cited by examiner

| 0.000 | -20.000 | -17.500 | -15.000 | -12.500 | -10.000 | -7.500 | -5.000 | -2.500 | 0.000 |
|---|---|---|---|---|---|---|---|---|---|
| 20.000 | 0.000 | 0.000 | 0.000 | 0.000 | 0.000 | 0.000 | 0.000 | 0.000 | 0.000 |
| 17.500 | 0.000 | 0.000 | 0.000 | 0.000 | 0.000 | 1.388 | 1.268 | 1.196 | 1.172 |
| 15.000 | 0.000 | 0.000 | 0.000 | 1.461 | 1.244 | 1.076 | 0.956 | 0.884 | 0.860 |
| 12.500 | 0.000 | 0.000 | 1.461 | 1.196 | 0.980 | 0.812 | 0.692 | 0.621 | 0.597 |
| 10.000 | 0.000 | 0.000 | 1.244 | 0.980 | 0.764 | 0.597 | 0.477 | 0.405 | 0.382 |
| 7.500 | 0.000 | 1.388 | 1.076 | 0.812 | 0.597 | 0.429 | 0.310 | 0.238 | 0.214 |
| 5.000 | 0.000 | 1.268 | 0.956 | 0.692 | 0.477 | 0.310 | 0.191 | 0.119 | 0.095 |
| 2.500 | 0.000 | 1.196 | 0.884 | 0.621 | 0.405 | 0.238 | 0.119 | 0.048 | 0.024 |
| 0.000 | 0.000 | 1.172 | 0.860 | 0.597 | 0.382 | 0.214 | 0.095 | 0.024 | 0.000 |
| -2.500 | 0.000 | 1.196 | 0.884 | 0.621 | 0.405 | 0.238 | 0.119 | 0.048 | 0.024 |
| -5.000 | 0.000 | 1.268 | 0.956 | 0.692 | 0.477 | 0.310 | 0.191 | 0.119 | 0.095 |
| -7.500 | 0.000 | 1.388 | 1.076 | 0.812 | 0.597 | 0.429 | 0.310 | 0.238 | 0.214 |
| -10.000 | 0.000 | 0.000 | 1.244 | 0.980 | 0.764 | 0.597 | 0.477 | 0.405 | 0.382 |
| -12.500 | 0.000 | 0.000 | 1.461 | 1.196 | 0.980 | 0.812 | 0.692 | 0.621 | 0.597 |
| -15.000 | 0.000 | 0.000 | 0.000 | 1.461 | 1.244 | 1.076 | 0.956 | 0.884 | 0.860 |
| -17.500 | 0.000 | 0.000 | 0.000 | 0.000 | 0.000 | 1.388 | 1.268 | 1.196 | 1.172 |
| -20.000 | 0.000 | 0.000 | 0.000 | 0.000 | 0.000 | 0.000 | 0.000 | 0.000 | 0.000 |

| | 0.000 | 2.500 | 5.000 | 7.500 | 10.000 | 12.500 | 15.000 | 17.500 | 20.000 |
|---|---|---|---|---|---|---|---|---|---|
| 20.000 | 0.000 | 0.000 | 0.000 | 0.000 | 0.000 | 0.000 | 0.000 | 0.000 |
| 17.500 | 1.196 | 1.268 | 1.388 | 0.000 | 0.000 | 0.000 | 0.000 | 0.000 |
| 15.000 | 0.884 | 0.956 | 1.076 | 1.244 | 1.461 | 0.000 | 0.000 | 0.000 |
| 12.500 | 0.621 | 0.692 | 0.812 | 0.980 | 1.196 | 1.461 | 0.000 | 0.000 |
| 10.000 | 0.405 | 0.477 | 0.597 | 0.764 | 0.980 | 1.244 | 0.000 | 0.000 |
| 7.500 | 0.238 | 0.310 | 0.429 | 0.597 | 0.812 | 1.076 | 1.388 | 0.000 |
| 5.000 | 0.119 | 0.191 | 0.310 | 0.477 | 0.692 | 0.956 | 1.268 | 0.000 |
| 2.500 | 0.048 | 0.119 | 0.238 | 0.405 | 0.621 | 0.884 | 1.196 | 0.000 |
| 0.000 | 0.024 | 0.095 | 0.214 | 0.382 | 0.597 | 0.860 | 1.172 | 0.000 |
| -2.500 | 0.048 | 0.119 | 0.238 | 0.405 | 0.621 | 0.884 | 1.196 | 0.000 |
| -5.000 | 0.119 | 0.191 | 0.310 | 0.477 | 0.692 | 0.956 | 1.268 | 0.000 |
| -7.500 | 0.238 | 0.310 | 0.429 | 0.597 | 0.812 | 1.076 | 1.388 | 0.000 |
| -10.000 | 0.405 | 0.477 | 0.597 | 0.764 | 0.980 | 1.244 | 0.000 | 0.000 |
| -12.500 | 0.621 | 0.692 | 0.812 | 0.980 | 1.196 | 1.461 | 0.000 | 0.000 |
| -15.000 | 0.884 | 0.956 | 1.076 | 1.244 | 1.461 | 0.000 | 0.000 | 0.000 |
| -17.500 | 1.196 | 1.268 | 1.388 | 0.000 | 0.000 | 0.000 | 0.000 | 0.000 |
| -20.000 | 0.000 | 0.000 | 0.000 | 0.000 | 0.000 | 0.000 | 0.000 | 0.000 |

Figure 3

WORKPLACE SCREEN LENS

The invention relates to workplace screen lens and use of a workplace screen lens.

Because of the trend toward smaller eyeglass frames, progressive lenses with a short progression have in the meantime become available in the product portfolio of various lens manufacturers. Lenses designed for special applications in the room area and at the job site have in the meantime become available in many cases. These lenses have been designed according to various aspects with respect to their possible applications and/or ranges of vision (see Table 1).

TABLE 1

| Maximum viewing distance for sharp vision in the upper area of the eyeglass lens | Minimum viewing distance for sharp vision up close | Product examples |
|---|---|---|
| Infinite | approx. 50 centimeters | Technica (AO), Datacomfort (Essilor), Hoyalux Tact (Hoya) |
| Between approx. 1.3 meters and approx. 2.1 meters (room area) | approx. 50 centimeters | Gradal RD (Zeiss), Cosmolit Office (Rodenstock), Intermezzo (Optovision)/ Mono Profi (Metzler), Sola Access (Blank)* |
| Between approx. 1.0 meter and approx. 0.70 meter (monitor screen and documents) | approx. 40 centimeters | Cosmolit P (Rodenstock), Delta (Essilor) |

*Progressive area design corresponds to Sola Access.

In Germany there are approximately 20 million monitor screen job sites and new ones are being added constantly in both the commercial and private areas. The users sitting at 20 to 35% of all monitor screen job sites are presbyopic but similar near vision demands based on an expanded near range apply not only at the job site using a monitor screen but also in many other professional and domestic activities. These vision requirements are comparable to demands of vision in working on a screen and can thus be solved more conveniently with such lenses. These vision requirements include clear vision in the broader environment of even more than two meters (increasing the distance correction required for correcting the hyperopia by approx. +0.50 diopter) in the main vision area. In the middle range, the lens should have the required effect and the largest possible fields of vision for an object distance between 60 and 90 centimeters. This area should be arranged on the lens so that it allows the user to maintain the ergonomically optimum head and body position, e.g., when working at a monitor screen. In the lower range of the lens, the increase in effect should end in a stable near zone which is suitable for the usual vision requirements in the near range such as reading or using a keyboard.

Especially in the intermediate range, i.e., for a vision task required mainly for users of monitor screens, the head must be raised slightly when using normal progressive lenses because for this distance it is necessary to look through the progressive zone. This is uncomfortable and leads to tension in the neck area. A lens designed specially for ergonomic aspects allows people to work at a workstation computer monitor without fatigue.

In this area, there is still no product that has a short progressive length and therefore may also be used for small eyeglass frames while having a suitably strong change in effect in the vertical direction.

The object of the present invention is to provide a lens for use at a workstation using a monitor screen which allows comfortable viewing at the workstation with respect to the vision ranges and also has a short progressive length, i.e., is suitable for use in fashionable small eyeglass frames.

The object of the present invention is achieved by the lens for use at a computer monitor workstation according to Claim 1 and use of a lens for use at a computer monitor workstation as claimed in Claim 8. Preferred embodiments of the present invention are the subject matter of the dependent claims.

The present invention comprises a lens for use at a workstation with a computer monitor having an area designed for seeing at room distance, hereinafter called the distance part, an area designed for seeing at short distances, especially for reading the keyboard and source documents, hereinafter referred to as the near part, and a progressive zone arranged between the far part and the near part, adjusted specifically for viewing the screen; in this progressive zone the effect of the eyeglass lens increases continuously along a curve running toward the nose, increasing from the value at the far reference point situated in the far part to the value of the near reference point situated in the near part, this curve hereinafter being referred to as the main line, which is not an umbilical curve, whereby the workplace screen lens is optimized at the center of the lens for middle viewing distances of approximately 60 centimeters to approximately 90 centimeters, the progressive channel at the center of the lens is at least 4 millimeters wide, the effect of the center of the lens with the vertical coordinate y approximately equal to 0 increases toward the bottom, and with y approximately equal to $-12$ millimeters, it achieves an essentially constant effect in the near vision zone, the progressive channel in the near vision zone, preferably at the near-reference point is at least 15 millimeters wide, the effect upward from the center of the lens to approximately y equal +10 to +12 millimeters decreases over the center of the lens, the progressive length amounts to approximately 20 millimeters to 25 millimeters, the main progressive length is between approximately 7 millimeters and 12 millimeters, the minimum width of the progressive channel is at least 4 millimeters.

Room distance in the sense of this invention means a distance from the eyeglass lens of preferably approximately 1.0 meter to approximately 3.0 meters, especially preferably from approximately 1.3 meters to approximately 2.1 meters. If the viewing distance for sharp vision is within room distance, this means in the sense of the present invention that sharp vision is possible at a distance of preferably approximately 1.0 meter to approximately 3.0 meters, especially preferably from approximately 1.3 meters to approximately 2.1 meters from the eyeglass lens, i.e., an object at this distance from the eyeglass lens can be focused by the wearer of the eyeglass lens, i.e., his eye.

The term near vision zone in the sense of the present invention is equivalent to near part. A near vision zone, i.e., a near part, is the part of a progressive lens designed for near range vision. In other words, the eyeglass lens is designed so that when viewing through the near vision zone, i.e., the near part of the lens, objects such as a keyboard or a page of paper on a table at a distance of preferably between approximately 10 centimeters and approximately 60 centimeters from the lens, especially preferably between approximately 25 centimeters and approximately 50 centimeters, can be seen essentially sharply. In particular, a stabilized near vision zone means that the value of the effect of the workplace screen lens essentially does not change, i.e., is essentially constant. In other words, the value of the effect of the workplace screen lens essentially no longer changes beyond a value of the y coordinate of approximately −12 millimeters, starting from the far reference point in the direction of the near reference point, preferably after reaching the near reference point. A change in the value of the addition, i.e., a near addition, i.e., the effect in the range of the near vision zone is especially preferably less than approximately 20%, especially preferably less than approximately 10% up to an imaginary lower edge of the lens at y=−20 millimeters.

A reference to an area at a shorter distance in the sense of this invention means a distance of preferably approximately 50 centimeters to approximately 100 centimeters, especially preferably from approximately 60 centimeters to approximately 90 centimeters. If a viewing distance for sharp vision is at a shorter distance, this means in the sense of the present invention that sharp vision is preferably possible at a distance of approximately 50 centimeters to approximately 100 centimeters, especially preferably from approximately 60 centimeters to approximately 90 centimeters, i.e., it is possible to focus on an object such as a computer monitor screen at this distance. If an object such as a computer monitor screen displaying text is at a shorter, i.e., short distance in the sense of this invention, then the computer monitor screen is preferably approximately at such a distance from a person that the person is able to read the text. Sharp vision is possible in particular in a range of shorter distances when viewing through the progressive zone of the eyeglass lens.

The workplace screen lens is optimized in particular for viewing distances between approximately 60 centimeters and approximately 90 centimeters, i.e., sharp vision is possible in particular for viewing distances between approximately 60 centimeters and approximately 90 centimeters. In particular the optical properties of the workplace screen lens are such that any vision defect of the wearer of the workplace screen lens especially for viewing distances between approximately 60 centimeters and approximately 90 centimeters is compensated at the center of the lens, which corresponds approximately to the traditional distance from the eye to the computer monitor screen.

Viewing distance in the sense of this invention is equivalent to the distance of an object which is observed, i.e., seen from the eyeglass lens.

The center of the lens of the workplace screen lens corresponds essentially to a range of the workplace screen lens from y being equal to approximately −4 millimeters to y being equal to approximately +4 millimeters and from x being equal to approximately −6 millimeters, preferably in a temporal lens area, to x being equal to approximately +8 millimeters, preferably in a nasal lens area, which includes the midpoint of the lens at x equal to approximately 0 millimeters and y equal to approximately 0 millimeter. The center of the lens thus preferably corresponds to a range of the workplace screen lens which is found approximately at a lowering of the line of sight of approximately 10° with regard to the zero direction of viewing.

The term umbilical curve in the sense of the present invention is equivalent to the term umbilical point line, whereby an umbilical curve is a curve consisting of a dense arrangement of umbilical points. An umbilical point is preferably a point on a surface in which both main curvatures are the same. The surface element surrounding the umbilical point is thus spherical, i.e., the astigmatism is equal to zero. A spherical surface consequently consists of umbilical points, but an aspherical surface having rotational symmetry has only one umbilical point. A toroidal surface does not have any umbilical point. For an umbilical point line and/or an umbilical curve, it therefore follows that there is no astigmatism along the umbilical point line, i.e., umbilical curve. Essentially a high visual acuity is possible along the umbilical curve.

The term vision channel is used in the sense of this invention as synonymous with progressive channel. Progressive channel, i.e., vision channel in the sense of the present invention refers to an area of a progressive lens which permits sharp vision for distances which are between near and far, whereby the term "far" used in the present patent refers to room distance, i.e., a distance from the lens of preferably approximately 1.0 meter to approximately 3 meters, especially preferably from approximately 1.3 meters to approximately 2.1 meters.

The vision channel, i.e., the progressive channel refers in particular to an area of the workplace screen lens which is bordered by the astigmatism isolines [corresponding to] a value of 0.25 diopter, i.e., between the astigmatism isolines corresponding to a value of 0.25 diopter and containing the main line. In other words, a connecting line connecting the two astigmatism isolines bordering the vision channel will intersect the main line. Most of the progressive channel has astigmatism values less than 0.25 diopter.

The vision channel has a width of at least 15 millimeters in the near range. In other words, the vision channel has a horizontal width of approximately 15 millimeters in the near vision zone, especially preferably with a y coordinate that corresponds essentially to the y coordinate of the near reference point. In the present invention, the width corresponds to the horizontal width measured at a constant y coordinate. In other words, essentially the length in the x-y plan of a horizontal line connecting the two ends of the vision channel is measured. In particular, in the sense of the present invention, this means that the horizontal distance between two opposing astigmatism isolines, i.e., two lines having the same astigmatism value which define the vision channel and are situated on opposite ends of the main line amounts to at least approximately 15 millimeters in the near part.

Clear vision in the sense of this invention means essentially sharp vision. In other words, an object that can be seen clearly is essentially imaged sharply, i.e., preferably with a vision of at least approximately 80%, especially preferably at least approximately 90%. In particular, clear vision in the broader environment in the sense of this invention in particular that an object which is at a distance where the work place screen lens is not designed for sharp vision, i.e., is not optimized, can still essentially be seen sharply.

In addition, the present invention includes a use of the workplace screen lens to correct a user's optical vision defect with an area hereinafter referred to as the far part designed for seeing at room distances, an area designed for seeing at shorter distances, in particular for reading a keyboard and documents, hereinafter referred to as the near part and a progressive zone situated between the far part and the near part, tailored specifically for looking at the monitor screen and in which the effect of the eyeglass lens increases continuously along a spiral curve toward the nose, hereinafter referred to as the main line, which is not an umbilical curve, from the value at the far reference point situated in the far part to the value of the near reference part situated in the near part, whereby the workplace screen lens is optimized for the middle viewing distances of approximately 60 centimeters to approximately 90 centimeters at the center of the lens, the progressive channel at the center of the lens is at least 4 millimeters wide, the effect increases from the center of the lens at the vertical coordinate y equal to approximately 0, increasing toward the bottom, reaching a near vision of an essentially constant effect at y equal to approximately −12 millimeters, the progressive channel in the near vision zone, preferably at the near reference point is at least 15 millimeters wide, the effect decreases from the center of the lens upward to y equal to approximately +10 millimeters to approximately +12 millimeters over the center of the lens, the progressive length is between 20 millimeters and approximately 25 millimeters, the main progressive length is between approximately 7 millimeters and approximately 12 millimeters and the minimum width of the progressive channel is at least 4 mm.

Differences between the individual state of the art products (Table 1) can be characterized by the change in the average effect in the use position and the respective distance between the two points between which this change in effect is achieved in comparison with a lens according to the present invention. The maximum change in effect along the helical main line is the difference in the maximum effect in the near area of the eyeglass lens and the minimum effect in the upper area of the eyeglass lens measured in diopters.

The tolerability of this lens design depends not only on the absolute value of the change in effect alone but also on the distance in which this change in effect is achieved in the eyeglass lens. This distance is defined as the vertical distance in the eyeglass lens, measured in millimeters, over which the maximum change in effect is achieved. To summarize these two parameters by which the differences between the existing eyeglass lens concept can be depicted, the so-called change coefficient has been introduced.

This change coefficient is defined as the quotient of the maximum difference in effect and distance of the change in effect. It describes the total change in effect over the progressive length and is given in diopter/millimeter.

As Table 2 shows, traditional workplace lenses are characterized in that they have change characteristics of less than 0.065 diopter/millimeter. In contrast with them, workplace lenses according to the present invention have changed characteristics greater than 0.07 diopter/millimeter. Table 2 shows lenses with an addition of approximately 2.0 diopters as an example.

TABLE 2

| Product name | Difference in effect (dpt) | Distance over which the change in effect is achieved (millimeter) | Change in effect per millimeter (change coefficient) |
| --- | --- | --- | --- |
| Hoyalux Tact | 2.4 | 37 | 0.065 |
| Datacomfort | 2.4 | 38 | 0.063 |
| AO Technica | 2.0 | 34 | 0.059 |
| Gradal RD | 1.7 | 32 | 0.053 |
| Delta | 0.9 | 38 | 0.02 |
| Sola Access | 1.3 | 23 | 0.057 |
| Cosmolit P | 1.7 | 39 | 0.044 |
| Cosmolit Office | 2.1 | 48 | 0.044 |
| Lens according to the present invention | 2.0 | 22-24 | 0.091-0.083 |

Table 3 shows various parameters of state-of-the-art lenses and the lens according to the present invention.

TABLE 3

Figure 2:
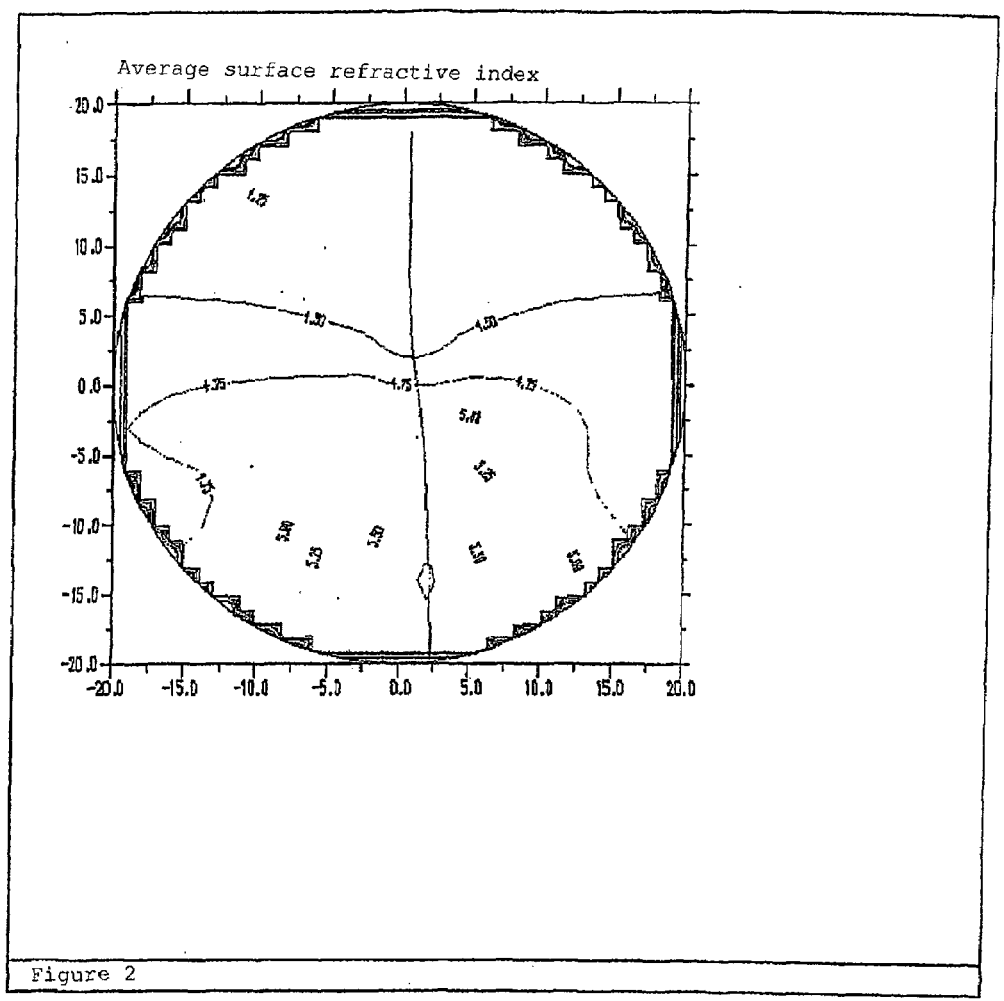

| Product | Add (dpt) | Max. gradient D (dpt/mm) | I (mm) | HPL (mm) | Min. width of vision channel (mm) | Width of vision channel at y = 0 (mm) | Width of vision channel near y = −12 (mm) |
| --- | --- | --- | --- | --- | --- | --- | --- |
| Office 1.0 | 0.92 | 0.075 | 48 | 14 | 4.6 | 11.1 | 7.0 |
| Office 1.75 | 1.55 | 0.122 | 47 | 14.5 | 4.6 | 11.0 | 8.0 |
| EP 0 911 670 FIGS. 2-4 | 1.0 | 0.085 | 20 | 12.4 | 3.5 | 3.9 | 6.5 |
| EP 0 911 670 FIGS. 6-8 | 2.0 | 0.167 | 20 | 12 | 4.0 | 4.7 | 8.0 |
| EP 0 911 670 FIGS. 9-11 | 3.0 | 0.25 | 20 | 12 | 3.9 | 4.3 | 8.5 |
| Invention | 1.6 | 0.147 | 24 | 9.5 | 4.5 | 4.6 | 15.5 |

The progressive length l is defined as the vertical distance between the points on the main line having the greatest and the least surface refractive index. These points should usually be situated in the upper part at approximately 10 to 20 millimeters and in the lower part at approximately −10 to approximately −20 millimeters. The addition Add is the difference between the refractive indexes at these two points.

In contrast with that the main progressive length HPL (as in EP 0 911 670 and EP 0 911 673) is calculated from the quotient of the addition and the maximum refractive index gradient max. gradient D.

The width of the vision channel is defined as the horizontal distance between the isolines of the surface astigmatism corresponding to the value of addition/3. This is an arbitrary finding to standardize the width of the vision channel and thus make it independent of the addition.

Furthermore, reference is also made to the definition of traditional technical terms as given in the relevant standards in particular the standard DIN EN ISO 13666:1998.

The present invention is described in greater detail with reference to the drawing as an example and without any restriction on the general inventive idea, to which reference is made explicitly with regard to the disclosure of all inventive details not explained in detail in the text. The drawings show:

FIG. 1: Surface astigmatism
FIG. 2: Average surface refractive index
FIG. 3: Cambers The present invention includes in particular a workplace screen lens having
- an area (far part) designed for seeing at room distances,
- an area (near part) designed for seeing at short distances, in particular for reading a keyboard and documents and
- a short progressive zone arranged between the far part and near part, tailored specifically for seeing on the screen; in this area, the effect of the lens increases continuously from the value in the far reference point located in the far part to the value of the near reference point located in the near part along a curve (main line) running toward the nose, not an umbilical curve,
characterized in that
- the workplace screen lens is optimized at the center of the lens for the middle viewing distances of 60 centimeters to 90 centimeters,
- the vision channel at the center of the lens is at least 4 millimeters wide,
- the effect increases from the center of the lens with the vertical coordinate y=0 toward the bottom and reaches a stabilized near vision zone at y=−12 millimeters,
- the vision channel has a width of at least 15 millimeters in the near part,
- the effect decreases from the middle of the lens upward to y=+10 to +12 millimeters over the middle of the lens and permits clear vision into the farther environment of the workplace and/or a good orientation in the room,
- the progressive length is approximately 20 to 25 millimeters,
- the main progressive length is between 7 and 12 millimeters and
- the minimum width of the progressive channel is at least 4 millimeters.

The invention claimed is:

1. Workplace screen lens, having
an area designed for seeing at room distance, hereinafter referred to as the far part,
an area designed for seeing at short distances, in particular for reading a keyboard and documents, hereinafter referred to as the near part and
a progressive zone situated between the near part and the far part, which is designed specifically for seeing on the screen and in which the effect of the lens increases continuously along a curve toward the nose, hereinafter referred to as the main line, which is not an umbilical curve, increasing from the value at the far reference point situated in the far part to the value at the near reference point situated in the near part, whereby
the workplace screen lens is optimized at the middle of the lens for the middle viewing distances of approximately 60 centimeters to approximately 90 centimeters,
the progressive channel at the middle of the lens is at least 4 millimeters wide,
the effect increases from the middle of the lens toward the bottom with the vertical coordinate y equal to approximately 0, reaching a near vision zone with an essentially constant effect at y equal to approximately −12 millimeters,
the progressive channel has a width of least 15 millimeters in the near vision zone, preferably at the near-reference point,
the effect decreases from the middle of the lens up to y equal to approximately +10 millimeters to approximately +12 millimeters above the middle of the lens,
the progressive length amounts to approximately 20 millimeters to approximately 25 millimeters,
the main progressive length is between approximately 7 millimeters and approximately 12 millimeters and
the minimum width of the progressive channel amounts to at least 4 millimeters.

2. Workplace screen lens as claimed in claim 1, characterized in that the change coefficient is greater than 0.07 diopter/millimeter.

3. Workplace screen lens as claimed in claim 1, whereby the progressive channel has a width of at least 4.5 millimeters in the middle of the lens.

4. Workplace screen lens as claimed in claim 1, whereby the progressive channel has a width of at least 15.5 millimeters in the near part.

5. Workplace screen lens as claimed in claim 1, whereby the main progressive length is between approximately 7 millimeters and approximately 10 millimeters.

6. Workplace screen lens as claimed in claim 1, whereby the minimum width of the progressive channel is at least 4.5 millimeters.

7. Workplace screen lens as claimed in claim 1, whereby the change in effect is achieved due to the change in surface refractive index on the front surface or on the back surface or on the front and back surfaces.

8. Workplace screen lens as claimed in claim 2, whereby the progressive channel has a width of at least 4.5 millimeters in the middle of the lens.

9. Workplace screen lens as claimed in claim 2, whereby the progressive channel has a width of at least 15.5 millimeters in the near part.

10. Workplace screen lens as claimed in claim 2, whereby the main progressive length is between approximately 7 millimeters and approximately 10 millimeters.

11. Workplace screen lens as claimed in claim 2, whereby the minimum width of the progressive channel is at least 4.5 millimeters.

12. Workplace screen lens as claimed in claim 2, whereby the change in effect is achieved due to the change in surface refractive index on the front surface or on the back surface or on the front and back surfaces.

13. Workplace screen lens as claimed in claim 3, whereby the progressive channel has a width of at least 15.5 millimeters in the near part.

14. Workplace screen lens as claimed in claim 3, whereby the main progressive length is between approximately 7 millimeters and approximately 10 millimeters.

15. Workplace screen lens as claimed in claim 3, whereby the minimum width of the progressive channel is at least 4.5 millimeters.

16. Workplace screen lens as claimed in claim 3, whereby the change in effect is achieved due to the change in surface refractive index on the front surface or on the back surface or on the front and back surfaces.

17. Workplace screen lens as claimed in claim 4, whereby the main progressive length is between approximately 7 millimeters and approximately 10 millimeters.

18. Workplace screen lens as claimed in claim 4, whereby the minimum width of the progressive channel is at least 4.5 millimeters.

19. Workplace screen lens as claimed in claim 4, whereby the change in effect is achieved due to the change in surface refractive index on the front surface or on the back surface or on the front and back surfaces.

20. Use of a workplace screen lens for correcting a user's vision defect, having

- an area designed for seeing at room distances, hereinafter referred to as the far part,
- an area designed for seeing at short distances, especially for reading the keyboard and documents, hereinafter referred to as the near part and
- a progressive zone arranged between the far part and the near part, which is designed specifically for seeing on the screen and in which the effect of the lens increases continuously from the value at the far reference point situated in the far part to the value at the near reference point situated in the near part along a curve running toward the nose, hereinafter referred to as the main line, which is not an umbilical curve, whereby the workplace screen lens is optimized at the middle of the lens for middle viewing distances of approximately 60 centimeters to approximately 90 centimeters, the progressive channel has a width of at least 4 millimeters at the center of lens, the effect increases from the middle of the lens with the vertical coordinate y equal to approximately 0 toward the bottom, reaching an essentially constant effect in the near vision zone at y equal to approximately −12 millimeters, the progressive channel is at least 15 millimeters in the near vision zone, preferably at the near-reference point, the effect decreases from the middle of the lens upward to y equal to approximately +10 millimeters to approximately +12 millimeters over the middle of the lens, the progressive length is approximately 20 millimeters to approximately 25 millimeters, the main progressive length is between approximately 7 millimeters and approximately 12 millimeters and the minimum width of the progressive channel is at least 4 millimeters.

\* \* \* \* \*